United States Patent [19]

Hirota et al.

[11] 4,068,257
[45] Jan. 10, 1978

[54] COLOR VIDEO SIGNAL RECORDING AND/OR REPRODUCING SYSTEM

[75] Inventors: Akira Hirota, Chigasaki; Yoshihiko Ota, Yokohama; Yoshiteru Kosaka, Kamakura, all of Japan

[73] Assignee: Victor Company of Japan, Ltd., Yokohama, Japan

[21] Appl. No.: 731,424

[22] Filed: Oct. 12, 1976

[30] Foreign Application Priority Data

Oct. 13, 1975 Japan .................................. 50-123069

[51] Int. Cl.$^2$ ............................................. H04N 5/79
[52] U.S. Cl. ..................................................... 358/4
[58] Field of Search ...................... 358/4, 8, 19, 27, 28; 360/33, 37

[56] References Cited

U.S. PATENT DOCUMENTS 3,798,361   3/1974   Narahara et al. ...................... 358/4

*Primary Examiner*—John C. Martin

[57] ABSTRACT

A color video signal recording system comprises a frequency modulator. A luminance signal is separated from an input color video signal. The amplitude of a color burst signal is intensified after it is separated from the input color video signal. The intensification is with respect to the amplitude of a carrier chrominance signal separated from the input color video signal. An automatic chroma control circuit receives the intensified color burst signal and the non-intensified carrier chrominance signal to effect level control. A specific level is not exceeded. A first frequency converter converts the frequency of the output signal of the automatic chroma control circuit. The converted signal is in a band which is lower than the band of said frequency-modulated luminance signal. The frequency-modulated luminance signal and the resulting output signal of said first frequency converter are mixed and multiplexed. A transducing head records the resulting mixed and multiplexed signal on a recording medium. A color video system reproduces a signal recorded by the above described recording system.

The reproducing system comprises a transducing head for reproducing the signal recorded on the recording medium. A demodulator separates the frequency-modulated luminance signal in the reproduced signal. A second frequency converter converts the frequency of the color burst signal and carrier chrominance signal separated from the reproduced signal. The signal is returned into the original frequency band thereby suppressing the amplitude of the color burst signal from the second frequency converter, with respect to the amplitude of the carrier chrominance signal. A demodulating circuit mixes the luminance signal the color burst signal of suppressed amplitude, and the carrier chrominance signal, and derives the resulting signal thus mixed as a reproduced color video signal.

8 Claims, 8 Drawing Figures

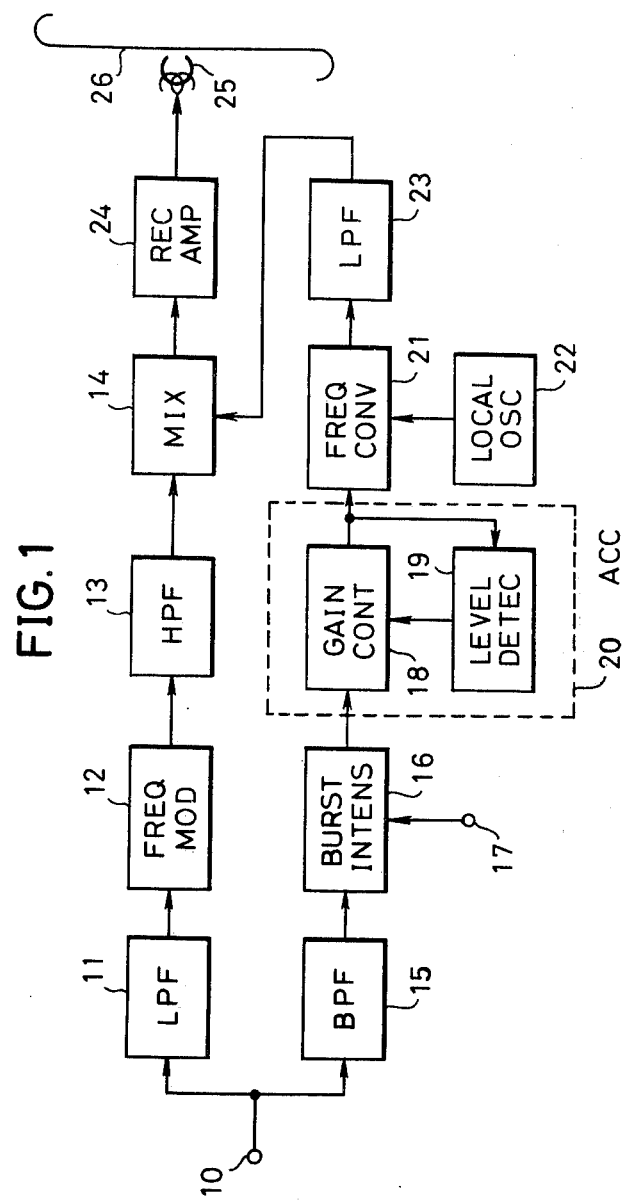

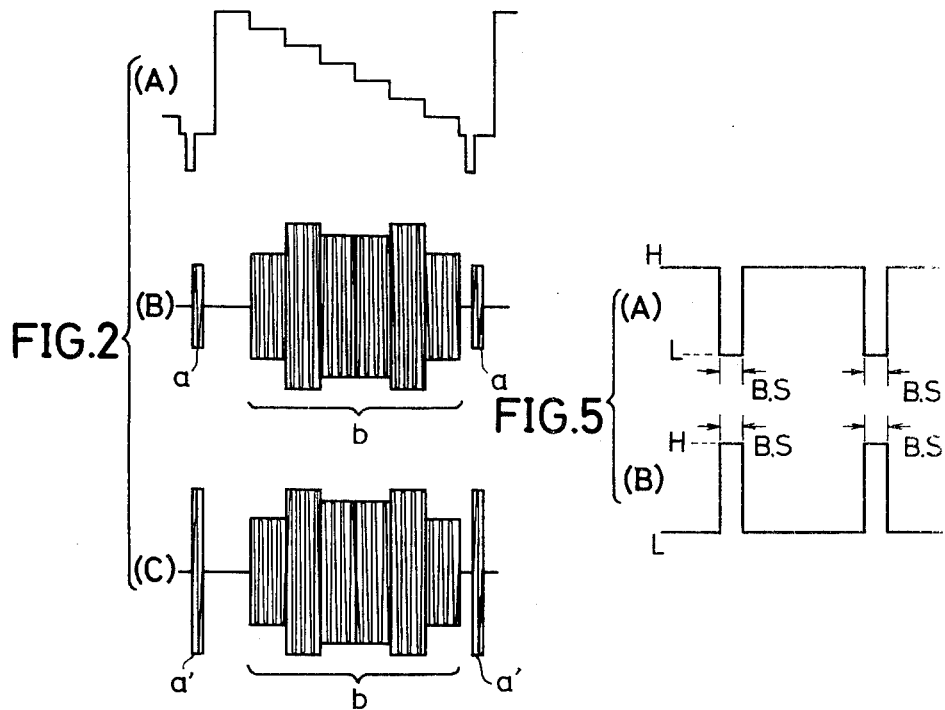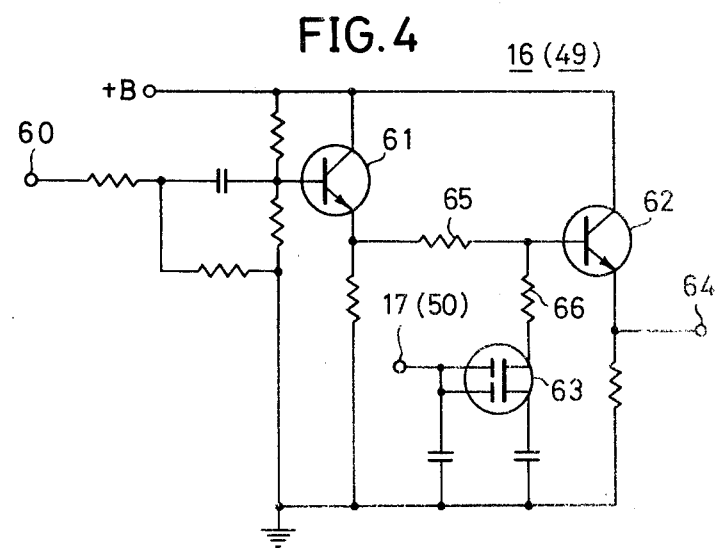

COLOR VIDEO SIGNAL RECORDING AND/OR REPRODUCING SYSTEM

BACKGROUND OF THE INVENTION

This invention relates generally to color video signal recording and/or reproducing systems, and more particularly to systems for recording and reproducing, with a large signal to noise (S/N) ratio, color burst signals of color video signals.

In general, it is necessary to correct the phase of a carrier chrominance signal in a color video reproducing system. In this case, the phase of the color burst signal within the reproduced signal is detected. The phase correction is carried out responsive to the resulting detection output.

Accordingly, in order to correct the phase accurately and positively, it is necessary that the color burst signal be recorded and reproduced with a large S/N ratio and in a stable manner.

Therefore, a previous system used an automatic gain control circuit which operated only during the periods when a color burst signal was present. The color burst signal is always recorded at a constant level which is optimum for recording. However, since a color burst signal does not exist in a black-and-white (monochrome) video signal, the high-frequency component of the monochrome video signal is amplified to an abnormally high level by an automatic gain control circuit. A deleterious effect is produced in the luminance signal.

For this reason, it is necessary, in this system, to provide a so-called color-killer circuit for detecting the presence or absence of a color burst signal and for cutting off the carrier chrominance signal transmission system, at the time when there is no color burst signal. However, this color-killer circuit is complicated, and the recording system cannot be produced at low cost. Furthermore, if there is a monochrome input video signal with a small S/N ratio, a noise component is erroneously detected as a color burst signal. The color-killer circuit does not operate normally despite the introduction of a monochrome video signal.

Accordingly, another system avoids use of a color-killer circuit. The peak value (maximum level value) of the entire chrominance signal is detected at the time of recording. Automatic chroma control (hereinafter referred to as ACC) is carried out. The ACC circuit in this system detects the peak value of the color burst signal. The ACC operation occurs when the amplitude of the carrier chrominance signal is less than the amplitude of the color burst signal. Conversely, if the amplitude of the carrier chrominance signal is greater than the amplitude of the color burst signal, the ACC circuit detects the peak value of the carrier chrominance signal, to carry out the ACC operation. For this reason, the amplitude of the color burst signal is disadvantageously varied by the magnitude (saturation) of the amplitude of the carrier chrominance signal. The amplitude of the color burst signal cannot be continually controlled at a constant amplitude, whereby color shading is produced.

Accordingly, we have solved the problems accompanying the previously conceived systems, as described above, and have devised the improved system of the present invention.

SUMMARY OF THE INVENTION

It is a general object of the present invention to provide a novel and useful color video signal recording and/or reproducing system which overcomes the above described difficulties.

Another and more specific object of the invention is to provide a color video signal recording and reproducing system capable of recording and reproducing the color burst signal with high S/N ratio. In accordance with the invention, it has become possible to record and reproduce a color burst signal continuously, at a constant level and with a large S/N ratio. Furthermore, a color-killer circuit is not necessary.

Still another object of the invention is to provide a color video signal recording and reproducing system adapted to intensify color burst signal of a color video signal. The color video signal is recorded after passing the entire chrominance signal through an ACC circuit. After reproducing the recorded signal, the color burst signal is suppressed.

Other objects and further features of the invention will be apparent from the following detailed description when read in conjunction with the accompanying drawings.

BRIEF DESCRIPTION OF THE DRAWINGS

In the drawings:

FIG. 1 is a block diagram showing one embodiment of a color video signal recording and reproducing system, according to the present invention;

FIG. 2(A) is a waveform of a luminance signal, and FIGS. 2(B) and 2(C) are waveforms of a color burst signal and a carrier chrominance signal;

FIG. 4 is a circuit showing one embodiment of a burst intensification circuit for use in the system of FIG. 1 and a burst suppression circuit for use in the system of FIG. 3; and FIGS. 5(A) and 5(B) are waveforms of signals applied to the circuits shown in FIG. 4.

DETAILED DESCRIPTION

Figure 3:
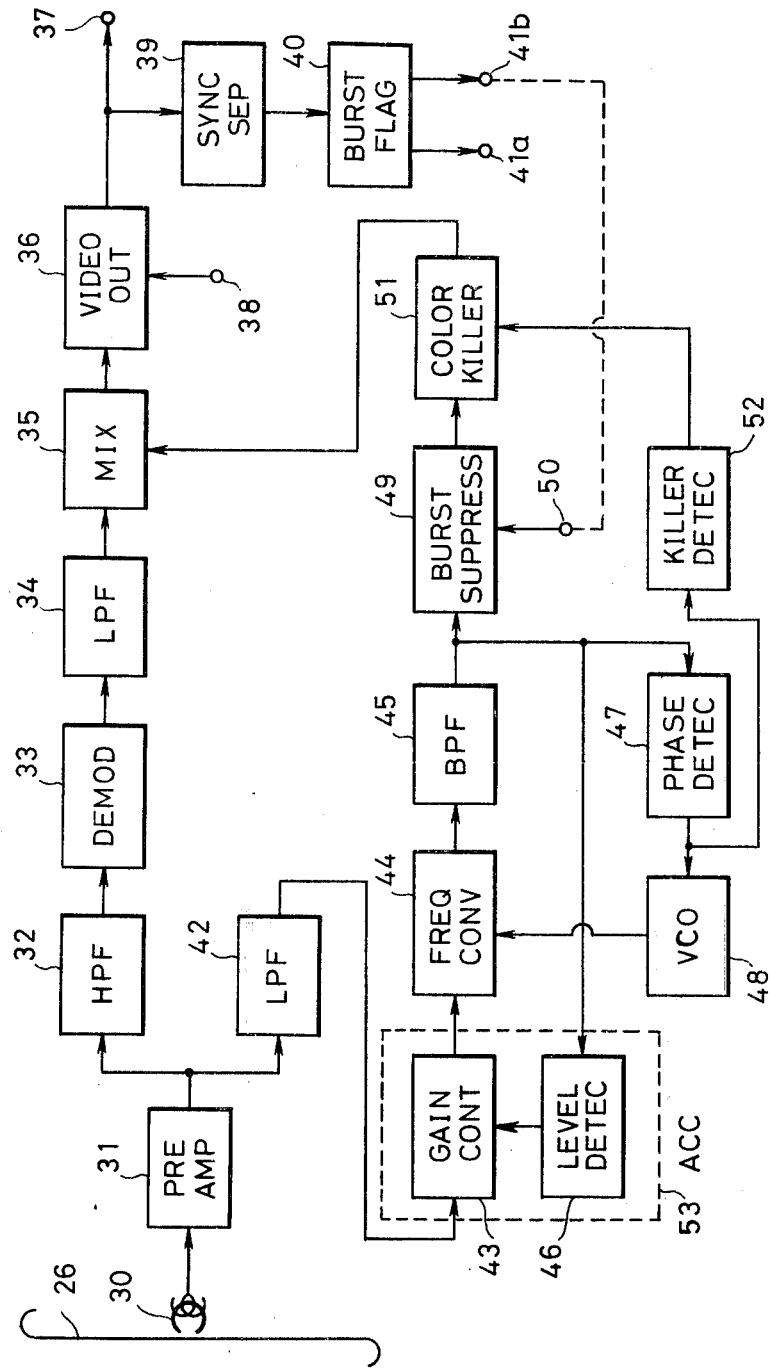
FIG. 3 is a block diagram showing one embodiment of the reproducing system according to the invention.

A recording system is illustrated in FIG. 1. An input recording color video signal is applied to an input terminal 10 and then to a low-pass filter 11 and a band-pass filter 15. The low-pass filter 11 passes a luminance signal having a waveform as indicated in FIG. 2(A), which is frequency modulated at a frequency modulator 12. The resulting frequency-modulated luminance signal is fed to a high-pass filter 13, where its unwanted components are removed, and then it is supplied to a mixer 14.

A carrier chrominance signal and a color burst signal which have passed through the band-pass filter 15 are supplied to a burst intensification circuit 16. This burst intensification circuit 16 operates in response to a signal applied to a terminal 17, to intensify the amplitude of only the color burst signal with respect to the carrier chrominance signal. This burst intensification circuit 16 increases the amplitude of only the color burst signal by two times, that is by 6dB. Accordingly, a signal comprising a color burst signal $a$ and a carrier chrominance signal $b$ of amplitudes as indicated in FIG. 2(B) may be supplied to the burst intensification circuit 16. This circuit 16 produces as output a signal comprising a color burst signal $a'$ having an amplitude which is double that of the input signal and a carrier chrominance signal $b$ having the same amplitude as the input signal as indicated in FIG. 2(C).

The same video signal that is supplied through the input terminal is also supplied through the terminal 38 of the reproducing system shown in FIG. 3. After passing through a video output circuit 36, it is led out through an output terminal 37. This output signal is fed to a monitor receiver and reproduced on a monitor picture screen. Simultaneously, the output signal of the video output circuit 36 is supplied to a synchronizing signal separation circuit 39. A synchronizing signal is separated and supplied to a burst flag pulse generating circuit 40. Signals of mutually inverted phases are led out, respectively, from the output terminals 41a and 41b of the generating circuit 40. The signal led out of the output terminal 41a is supplied through the above mentioned terminal 17 to the burst intensification circuit 16.

The signal resulting from the intensification of the burst signal is indicated in FIG. 2(C) and supplied to a gain control circuit 18. The gain control circuit 18 operates automatically in response to the output signal of a level detector 19. The detected level of the output signal of the gain control circuit 18 controls the gain control. The gain control circuit 18 and the level detector 19 constitute an ordinary ACC circuit 20. The ACC circuit 20 carries out an ACC operation. The color burst signal $a'$ and the carrier chrominance signal $b$ will be accommodated within a specific amplitude value.

In actual practice, if the carrier chrominance signal $b$ is a color bar signal of the greatest amplitude, as indicated in FIG. 2(B), the amplitude in the color bar signal is of the order of twice the amplitude of the color burst signal $a$. For this reason, the amplitude of the color burst signal $a'$ (FIG. 2(C)) is intensified two times and always is in the same order as or greater than the amplitude of the carrier chrominance signal $b$. As a result, even after passing through the ACC circuit 20, the color burst signal $a'$ is always recorded at the maximum level, as described hereinafter. Therefore, the color burst signal can be recorded and reproduced with a double S/N ratio, that is, with a S/N ratio improved by 6dB. Furthermore, even after passing through the ACC circuit 20, the amplitude of the color burst signal $a'$ is always constant, not being influenced by the amplitude of the carrier chrominance signal $b$. For this reason, color shading does not occur in the reproduced signal.

The output signal of the gain control circuit 18 is supplied to a frequency converter 21. There, it is frequency converted, responsive to a local oscillator 22, to a frequency band which is lower than the band of the frequency-modulated luminance signal. The resulting frequency converted output signal is then passed through a low-pass filter 23. There its unwanted component is removed. Then, it is supplied to the mixer 14 to be mixed and multiplexed with the frequency-modulated luminance signal. The resulting output signal of the mixer 14 is amplified by a recording amplifier 24 and thereafter recorded by head 25 on a recording medium 26.

If a monochrome video signal is applied to the input terminal 10, instead of a color video signal, and if a high-frequency component such as noise of this monochrome video signal has passed through the band-pass filter 15, the ACC circuit 20 detects the maximum level of this noise component. The resulting ACC operation prevents this maximum level from exceeding a specific level. Therefore, even if a color burst signal does not exist, there is no undesirable abnormally high level amplification of the noise component. Accordingly, it is not necessary to provide a color-killer circuit in the carrier chrominance signal transmission system.

Next, a system for reproducing a signal recorded in the above described manner will be described, with reference to FIG. 3.

A signal recorded on the recording medium 26 by the above described recording system is reproduced by head 30. The reproducing head 30 may be the same as the recording head 25. The reproduced signal is passed through a pre-amplifier 31 and then supplied to a high-pass filter 32 and a low-pass filter 42. The frequency-modulated luminance signal which has passed through the high-pass filter 32 is demodulated by a demodulator 33. The demodulated signal is fed to a low-pass filter 34, where its unwanted component is removed, and then it is supplied to a mixer 35.

On the other hand, the color burst signal and the carrier chrominance signal which have passed through the low-pass filter 42 are supplied to a gain control circuit 43. There, the gain of the signal is controlled in conformance with the output of a level detector 46. The gain control circuit 43 and the level detector 46 constitute an ACC circuit 53. The output signal of the gain control circuit 43 is supplied to a frequency conversion circuit 44. There it is restored by frequency conversion to the original frequency band by the output of a voltage controlled oscillator (VCO) 48. The resulting output signal of the frequency converter 44 is fed to a band-pass filter 45. There its unwanted component is removed. Then, it is supplied to a burst suppression circuit 49 and, at the same time, to the level detector 46 and a phase detector 47. The resulting output of the phase detector 47 controls the output frequency of VCO 48.

Thus, the frequency converter 44 carries out a frequency conversion in conformance with the output of the VCO 48, the frequency of which is controlled by the output of the phase detector 47. For this reason, the color burst signal and the carrier chrominance signal are frequency converted and phase corrected by the frequency converter 44. The time base fluctuation component is removed.

The burst suppression circuit 49 operates in response to a signal applied through a terminal 50. The amplitude of only the color burst signal is suppressed to a level (one-half in the instant embodiment of the invention) corresponding to the intensification in the recording system. This suppression restores the amplitude to the original level. The carrier chrominance signal which has passed through the burst suppression circuit 49 and the color burst signal which has been suppressed in this circuit are passed through a color-killer circuit 51 and supplied to the aforementioned mixer 35. There, they are mixed with the demodulated luminance signal to form a color video signal.

The output of the phase detector 47 is also supplied to a color-killer control voltage detector 52. This detector 52 operates when the reproduced signal is a monochrome signal. A color burst signal is not supplied to the phase detector 47 to apply a killer voltage to the color-killer circuit 51, to open this circuit.

The reproduced color video signal from the mixer 35 passes through the video output circuit 36. Then, it is supplied through the output terminal 37 to a television receiver, to be reproduced as a picture. The output signal of the video output circuit 36 is also supplied to the synchronizing signal separation circuit 39. The signal from the output terminal 41b of the burst flag pulse generating circuit 40 is applied to the terminal 50.

The embodiment of the recording system shown in FIG. 1 is adapted so that the amplitude of the color burst signal is increased during an intensifying of the burst signal in the burst intensification circuit 16. The recording system may also be adapted so that the color burst signal is maintained as it is, and the amplitude of the carrier chrominance signal is suppressed. The essential requirement is that the amplitude of the color burst signal should be increased relative to the amplitude of the carrier chrominance signal. Accordingly, the reproducing system (FIG. 3) is adapted to suppress only the color burst signal. It may also be adapted so that the color burst signal is maintained as it is, while the carrier chrominance signal is increased to suppress the color burst signal relative to the carrier chrominance signal.

FIG. 4 shows one embodiment of a specific burst intensification circuit 16 and burst suppression circuit 49. The circuit of the burst intensification circuit 16 and the burst suppression circuit 49 are exactly the same. The signal applied to the terminal 17 (or 50) differs. A color burst signal and a carrier chrominance signal from the band-pass filter 15 are supplied through an input terminal 60 to the burst intensification circuit 16 in the recording system. These signals pass through transistors 61 and 62 and to an output terminal 60, and on to the ACC circuit 20. Between the emitter of the transistor 61 and the base of the transistor 62, there is connected a resistor 65. From a junction between this resistor 65 and the base of the transistor 62, a resistor 66 and a field-effect transistor (FET) 63 are connected in series to ground. The terminal 17 is connected to the gate of the FET 63.

A low level signal L in a color burst signal period B.S and a high level signal H in other periods, as indicated in FIG. 5(A), is applied from terminal 41a to the terminal 17. As a consequence, during the color burst signal period B.S, the FET 63 switches "OFF". The color burst signal is led out, with its amplitude unchanged, through the output terminal 64.

During other than the color burst signal periods, the FET 63 switches "ON." Here, the internal resistance of the FET 63 in its conductive state is approximately 180 Ω. The resistance values of the resistors 65 and 66 are 1 KΩ and 820 Ω, respectively. Consequently, when the FET 63 is "ON," the voltage of the carrier chrominance signal is divided by the resistance (1 KΩ) of the resistor 65 and the sum (1 KΩ) of the resistance of the resistor 66 and the internal resistance of the FET 63. Its amplitude is halved and led out through the output terminal 64. Therefore, the amplitude of the carrier chrominance signal is suppressed to one-half. In contrast, the amplitude of the color burst signal is maintained as it is. The resultant effect is that the amplitude of the color burst signal has been intensified by two times, relative to the amplitude of the carrier chrominance signal.

If the circuit of FIG. 4 is used as the burst suppression circuit 49 in the reproducing system, a signal from the band-pass filter 45 is applied to the terminal 60. A signal (FIG. 5(B)) is led from terminal 41b to the terminal 50, (i.e., the same position as the terminal 17). A signal applied to the terminal 50 has an inverted phase relationship relative to a signal applied to the terminal 17. The color burst signal period B.S. is at a high level H, while the other periods are at a low level L. Consequently, during the color burst signal period B.S., the FET 63 is in its conductive state. The amplitude of the color burst signal is suppressed to ½. During other periods, the FET 63 is in its nonconductive state. The carrier chrominance signal is led out with its amplitude as it is. Therefore, the amplitude of the color burst signal is suppressed by one-half relative to the carrier chrominance signal.

Since a color burst signal which is recorded and reproduced by the system of the present invention is improved in S/N ratio by 6dB, for example, jitter correction is also improved by 6dB through the use of this color burst signal.

Further, this invention is not limited to these embodiments but various modifications may be made without departing from the scope and spirit of the invention.

What is claimed is:

1. A color video signal recording system comprising:
   first separation means for separating a luminance signal from an input color video signal;
   means for frequency modulating said separating luminance signal;
   second separation means for separating a color burst signal and a carrier chrominance signal from said input color video signal;
   means for intensifying the amplitude of said separated color burst signal with respect to the amplitude of said carrier chrominance signal;
   automatic gain control means for controlling the levels of the intensified color burst signal and the non-intensified carrier chrominance signal so that a specific level is not exceeded;
   first frequency conversion means for frequency converting the output signal of said automatic gain control means into a band which is lower than the band of said frequency-modulated luminance signal; and
   means for mixing and multiplexing said frequency-modulated luminance signal with the output signal of said first frequency conversion means and for recording the resulting mixed and multiplexed signal on a recording medium.

2. A color video signal recording system as claimed in claim 1 in which said intensifying means intensifies the amplitude of said color burst signal to become twice the amplitude of said carrier chrominance signal.

3. A color video signal recording system as claimed in claim 1 in which said intensifying means intensifies the amplitude of said color burst signal and passes said carrier chrominance signal with its amplitude unchanged.

4. A color video signal recording system as claimed in claim 1 in which said intensifying means passes said color burst signal with its amplitude unchanged and suppresses the amplitude of said carrier chrominance signal.

5. A color video signal reproducing system for reproducing a signal recorded by the recording system as claimed in claim 1, said reproducing system comprising:
   means for reproducing said mixed and multiplexed signal recorded on said recording medium;
   third separation means for separating the frequency-modulated luminance signal from the reproduced signal;
   means for demodulating the separating frequency-modulated luminance signal;
   fourth separation means for separating the frequency converted color burst signal and carrier chrominance signal from the reproduced signal;

second frequency conversion means responsive to said fourth separation means for frequency converting the separated signal into the original frequency band to produce a color burst output signal and a carrier chrominance signal;

means for suppressing the amplitude of said color burst signal from said second frequency conversion means with respect to the amplitude of said carrier chrominance signal; and means for mixing said demodulated luminance signal, said color burst signal of suppressed amplitude, and the non-suppressed carrier chrominance signal, and deriving the resulting signal as a reproduced color video signal.

6. A color video signal reproducing system as claimed in claim 5, said system reproducing a signal recorded by the recording system claimed in claim 2, and means whereby said suppression means suppresses the amplitude of said color burst signal to one-half relative to the amplitude of said carrier chrominance signal.

7. A color video signal reproducing system as claimed in claim 5 in which said suppression means has the same circuit as said intensifying means and means for supplying an operation control signal having a phase opposite to the phase of an operation control signal supplied to said intensifying means.

8. A color video signal reproducing system as claimed in claim 5 in which said second frequency conversion means comprises a frequency converter supplied with the output of said fourth separation means, means for phase detecting the output signal of said frequency converter, and variable frequency oscillation means operating at a frequency which is controlled responsive to the output of said phase detecting means and means for supplying the resulting output from said oscillation means to said frequency converter.

* * * * *